(12) United States Patent
Maier-Schleich et al.

(10) Patent No.: US 9,500,365 B2
(45) Date of Patent: Nov. 22, 2016

(54) PRESSURE-MEASURING DEVICE WITH ADDITIONAL DIAPHRAGM

(71) Applicant: Robert Bosch GmbH, Stuttgart (DE)

(72) Inventors: Anke Maier-Schleich, Leutenbach (DE); Janpeter Wolff, Wurmberg (DE); (Continued)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 14/361,581

(22) PCT Filed: Nov. 30, 2012

(86) PCT No.: PCT/EP2012/074095
§ 371 (c)(1),
(2) Date: May 29, 2014

(87) PCT Pub. No.: WO2013/079661
PCT Pub. Date: Jun. 6, 2013

(65) Prior Publication Data
US 2015/0027213 A1    Jan. 29, 2015

(30) Foreign Application Priority Data

Dec. 2, 2011  (DE) .................. 10 2011 087 641

(51) Int. Cl.
*G01M 15/04* (2006.01)
*F23Q 7/00* (2006.01)
(Continued)

(52) U.S. Cl.
CPC ........... *F23Q 7/001* (2013.01); *G01L 19/0645* (2013.01); *G01L 19/0681* (2013.01); *G01L 23/10* (2013.01);
(Continued)

(58) Field of Classification Search
CPC ................... F23Q 2007/002; F23Q 2007/005; G01L 19/0645; G01L 19/0681; G01L 23/10; G01M 15/042
(Continued)

(56) References Cited

U.S. PATENT DOCUMENTS 7,032,438 B2 * 4/2006 Heinzelmann .......... G01L 23/22
                                                              73/114.21
7,431,003 B2 * 10/2008 Ludwig .................. G01L 23/10
                                                              123/145 A
(Continued)

FOREIGN PATENT DOCUMENTS

DE   10 2005 016 464   10/2006
EP       1 707 935       10/2006
(Continued)

*Primary Examiner* — Freddie Kirkland, III
(74) *Attorney, Agent, or Firm* — Norton Rose Fulbright US LLP; Gerard Messina

(57) ABSTRACT

A pressure-measuring device for recording a pressure in a combustion chamber of an internal combustion engine, having a force transmission body, situated in a housing, which is exposed to the combustion chamber and which transmits the combustion chamber pressure to a pressure-measuring unit at least indirectly by an axial motion, and having a flexible diaphragm, which is situated between the force transmission body and the housing. The flexible diaphragm is configured to be resilient to implement the axial motion of the force transmission body within the housing. A flexible additional diaphragm is connected ahead of the flexible diaphragm on the combustion chamber side, which seals the flexible diaphragm from the combustion chamber.

9 Claims, 3 Drawing Sheets

(72) Inventors: Wolfgang Koetzle, Ehningen (DE);
Christian Doering, Stuttgart (DE);
Juergen Krueger, Heilbronn (DE);
Holger Scholzen, Stuttgart (DE);
Martin Ammann, Felben-Wellhausen (CH); Michael Mueller, Truellikon (CH)

(51) Int. Cl.
*G01L 19/06* (2006.01)
*G01L 23/10* (2006.01)

(52) U.S. Cl.
CPC ...... *G01M 15/042* (2013.01); *F23Q 2007/002* (2013.01); *F23Q 2007/005* (2013.01)

(58) Field of Classification Search
USPC .................................................. 73/114.18
See application file for complete search history.

(56) References Cited

U.S. PATENT DOCUMENTS

| | | | | |
|---|---|---|---|---|
| 7,472,600 B2 * | 1/2009 | Wolfer | .................... | G01L 23/22 361/283.1 |
| 8,205,490 B2 * | 6/2012 | Mueller | .................. | G01L 23/10 73/114.16 |
| 8,217,309 B2 * | 7/2012 | Burrows | ................. | F23Q 7/001 219/260 |
| 8,250,909 B2 * | 8/2012 | Kern | ....................... | G01L 23/10 73/114.16 |
| 8,397,556 B2 * | 3/2013 | Last | ........................ | F23Q 7/001 73/114.19 |
| 8,875,565 B2 * | 11/2014 | Ramond | ................. | G01L 23/10 73/114.19 |
| 8,893,545 B2 * | 11/2014 | Nakamura | ............ | G01M 15/08 73/114.18 |
| 8,939,121 B2 * | 1/2015 | Nishiyuki | ............... | F23Q 7/001 123/145 A |
| 8,950,247 B2 * | 2/2015 | Borgers | ................ | G01M 15/08 73/114.18 |
| 8,978,454 B2 * | 3/2015 | Pottiez | .................... | G01L 23/10 73/114.18 |
| 2001/0015402 A1 | 8/2001 | Murai et al. | | |
| 2009/0320576 A1 | 12/2009 | Borgers et al. | | |

FOREIGN PATENT DOCUMENTS

GB  1 207 562  10/1970
WO  2006/072514  7/2006

* cited by examiner

PRESSURE-MEASURING DEVICE WITH ADDITIONAL DIAPHRAGM

FIELD OF THE INVENTION

The present invention relates to a pressure-measuring device for recording the combustion chamber pressure of an internal combustion engine.

BACKGROUND INFORMATION

German document DE 10 2005 061 879 A1 discusses a sheathed-element glow plug for an internal combustion engine, in which a pressure-measuring unit is accommodated in an housing. The sheathed-element glow plug further includes a heating element which is displaceable with respect to the housing and cooperates at least indirectly with the pressure sensor so as to enable a measurement of the pressure in the combustion chamber of the internal combustion engine. For this purpose, the heating element is acted upon with the pressure that prevails in the combustion chamber, and, via a supporting tube and a force transmission sleeve, a force is exerted upon the pressure sensor. The pressure sensor may be executed as a piezoelectric element, which is picked off via measuring lines.

Furthermore, the sheathed-element glow plug has an end on the combustion chamber side which is exposed to the conditions, especially the temperature, that prevail in the combustion chamber. At the end on the combustion chamber side, the sheathed-element glow plug has a sealing chamber in which a flexible diaphragm is accommodated. Between the diaphragm and the heating element there is additionally provided a sealing agent which is connected ahead of the flexible diaphragm. The sealing agent protects the sealing chamber from contamination which, after a certain operating duration, would reduce the accuracy of the measurement of the pressure in the combustion chamber. In this context, the sealing agent may be configured to be temperature-resistant and flowable. Alternatively, the sealing agent may be in the form of a powder or a paste.

German patent document DE 10 2004 012 673 A1 discusses a sheathed-element glow plug for an internal combustion engine, which includes a spark-plug shell, a glow element and an integrated pressure sensor. Between the glow element and the spark-plug shell a relative motion is possible. In operation, the glow element is acted upon by a combustion chamber pressure, whereby the glow element carries out a relative motion with respect to the spark-plug shell. In the light of the extent of the relative motion, the pressure sensor ascertains the magnitude of the pressure that prevails in the combustion chamber. Between an inner surface of the spark-plug shell and the glow element there is an elastic element which seals the space between the spark-plug shell and the glow element. The elastic element is configured as an annular element or a spring element. An alignment of the elastic element takes place via a supporting part, a wraparound ring applied inside the housing or welding seams.

The flexible diaphragm applied between the glow element as force transmission body and the spark-plug shell has a thermal shock applied to it, by the high temperatures prevailing in the combustion chamber of the internal combustion engine, whereby its elastic behavior changes, and because of that, the measuring result becomes corrupted. Furthermore, the thermal shock represents a thermomechanical stress of the flexible diaphragm, in response to which high local and temporal temperature gradients occur in the diaphragm. Thermal expansions and stresses go along with the high temperature gradients, which reduce the service life of the flexible diaphragm.

SUMMARY OF THE INVENTION

The pressure-measuring device, according to the present invention, has the advantage that the flexible diaphragm is reliably sealed in the direction towards the combustion chamber, and is protected or screened from the heat of the combustion chamber. Thereby the pressure, which prevails in a combustion chamber of an internal combustion engine, is also able to be measured accurately under unfavorable conditions. In the process, the accuracy of the measurement is maintained over a long service life. The additional diaphragm, in this case, screens the flexible diaphragm, which is mounted between the inner side of the housing and the outer side of the force transmission body, from temperature effects and the effects of the fuel from the combustion chamber of the internal combustion engine. The pressure-measuring device according to the present invention provides in a simple manner a possibility of minimizing the disadvantageous effects of a thermal shock on the diaphragm. The measuring accuracy of the pressure-measuring device is practically not impaired by the positioning of the additional diaphragm and at the same time, the service life of the pressure-measuring device is extended.

Advantageous refinements of the present invention are possible because of the measures of the dependent claims.

Because the flexible additional diaphragm is executed to be floppy, the relative motion between the force transmission body and the housing is impaired only minimally. Floppy means that the flexural stiffness of the additional flexible diaphragm is clearly less than the flexural stiffness of the flexible diaphragm. Because of that, the additional diaphragm does not absorb any substantial flexural stresses, and thus it has only minimal mechanical effects on the pressure force absorbed and measured using the force transmission body. This ensures an high measuring accuracy of the pressure measuring device according to the present invention.

One advantageous specific embodiment occurs when a first and a second supporting ring are situated on an outer side of the force transmission body and on the inner side of the housing, and when the flexible additional diaphragm is situated between the first and the second supporting ring. In this context, an annular gap is configured between the first and the second supporting ring, the flexible additional diaphragm covering the annular gap being situated on an end face on the combustion chamber side of the first and the second supporting ring.

Furthermore, applying the additional diaphragm on the end faces of the first and second supporting rings has the effect that the additional diaphragm is pressed against the supporting rings by the pressure in the combustion chamber of the internal combustion engine. This ensures a stable, planar contact pressure of the additional diaphragm to the supporting rings.

Moreover, the pressure-measuring device according to the present invention may be mounted in such a way that the force transmission body is offset with respect to the housing in the axial direction, in the direction to the combustion chamber. The additional diaphragm is thereby prestressed upon being mounted. During the operation of the pressure-measuring device, a pressure force from the combustion chamber acts against the prestressing of the additional diaphragm. In this instance, the force transmission body is axially moved away, with respect to the housing, from the combustion chamber in the axial direction, so that the end faces of the supporting rings are flush opposite to each other. In this case, the additional diaphragm is in a position in which it is nearly free of mechanical stresses. Fluctuations in the pressure in the combustion chamber thus have the effect of slight relative motions between the force transmission body and the housing, whereby, during operation, the additional diaphragm is only exposed to slight flexural stresses. Low pressure fluctuations in the combustion chamber have the effect of a slight fluctuation of the additional diaphragm about the position in which it is nearly free of mechanical stresses. This increases the service life of the additional diaphragm.

It is of advantage if the additional diaphragm is produced from a thermally conductive material. In response to intensive temperature effects, thermally conductive materials tend to uniform temperature distributions and low local temperature gradients. This lowers the effect of a thermal shock on the additional diaphragm. The impairment of additional components by thermal shock stress is counteracted. Thereby a high screening effect and high reliability are ensured for the additional diaphragm. In the same way it may be the case that the additional diaphragm is made of a high-strength steel alloy. High-strength steel alloys have high temperature stability and fatigue strength, and are easy to manufacture. Furthermore, high-strength steel alloys are able to be welded. The temperature stability and the fatigue strength of high-strength steel alloys advantageously satisfy the requirements with respect to mechanical and thermal loading capacity, which are put on an additional diaphragm. This counteracts a deterioration of the measuring accuracy of the pressure-measuring device by a degradation of the material, and a long service life of the pressure-measuring device is ensured.

The additional diaphragm may be connected to the supporting rings via a sealed encircling weld. Encircling welds are simple to produce, and ensure an high stability at high temperatures. This ensures a reliable sealing of the flexible diaphragm lying behind them. Furthermore, the producing of such weldings may simply be automated. An encircling welding is up to the requirements for stability and temperature resistance of an additional diaphragm, which are submitted to the pressure and temperature effects from a combustion chamber of an internal combustion engine, and ensures high reliability of the additional diaphragm.

The additional diaphragm may be configured as a foil having a thickness of 0.05 mm to 0.5 mm. A thickness of 0.05 mm to 0.5 mm ensures an effective screening of the flexible diaphragm, which stands up to the conditions in a combustion chamber of an internal combustion engine. The additional diaphragm is thereby easily deformable. The additional diaphragm easily takes on an arched shape and absorbs practically no bending torques. A thickness of 0.05 mm to 0.5 mm advantageously lends an additional diaphragm the property of a foil, in order to represent a thermal screening and at the same time to have a great measure of deformability.

Moreover, an annular gap is configured between the first and second supporting ring, the width of the gap amounting to a single time to three times the thickness of the additional diaphragm. The width of the annular gap determines how far the additional diaphragm is able to arch away from the combustion chamber as a result of the pressure stress. In this case, a wide gap ensures a high axial mobility of the force transmission body with respect to the housing, without the additional diaphragm impairing the relative motion between the force transmission body and the housing. By contrast, a narrow gap ensures that the additional diaphragm is deformed only slightly as a result of the pressure effect from the combustion chamber. In this case, only a slight curvature is created of the additional diaphragm in the area of the gap. Thereby, the surface of the additional diaphragm that is acted upon by pressure remains almost constant, so that practically no impairment of the measuring result of the pressure-measuring device occurs. An annular gap having a width that is a single time to three times the thickness of the additional diaphragm ensures an advantageous combination of axial mobility of the force transmission body with respect to the housing and the measuring accuracy of the pressure-measuring device.

Furthermore, specific embodiments of the pressure-measuring device may be used in which at least one support ring has a rounded edge. A rounded edge of a support ring makes possible a continuous contact of the additional diaphragm in the area of the annular gap. Because of this, arched areas of the additional diaphragm have small radii of curvature. Thereby, in the areas of low radii of curvature, lower mechanical stresses take place. Lowered mechanical stresses of the additional diaphragm increase its service life and its reliability.

The additional diaphragm is exposed to a combustion gas from the combustion chamber, which has a high temperature. Moreover, the combustion gas includes, so that the additional diaphragm is exposed to an high risk of corrosion. An additional diaphragm, made of a corrosion-resistant material, stands up to these adverse conditions and has an increased reliability. Furthermore, an additional diaphragm in a pressure-measuring device is exposed to a large number of load cycles. That is why there is a danger for the additional diaphragm of a failure as a result of material fatigue. An additional diaphragm, made of a fatigue-proof material, stands up to a large number of load changes.

The present invention is explained in detail in the following description and the drawings.

DETAILED DESCRIPTION

Figure 1:
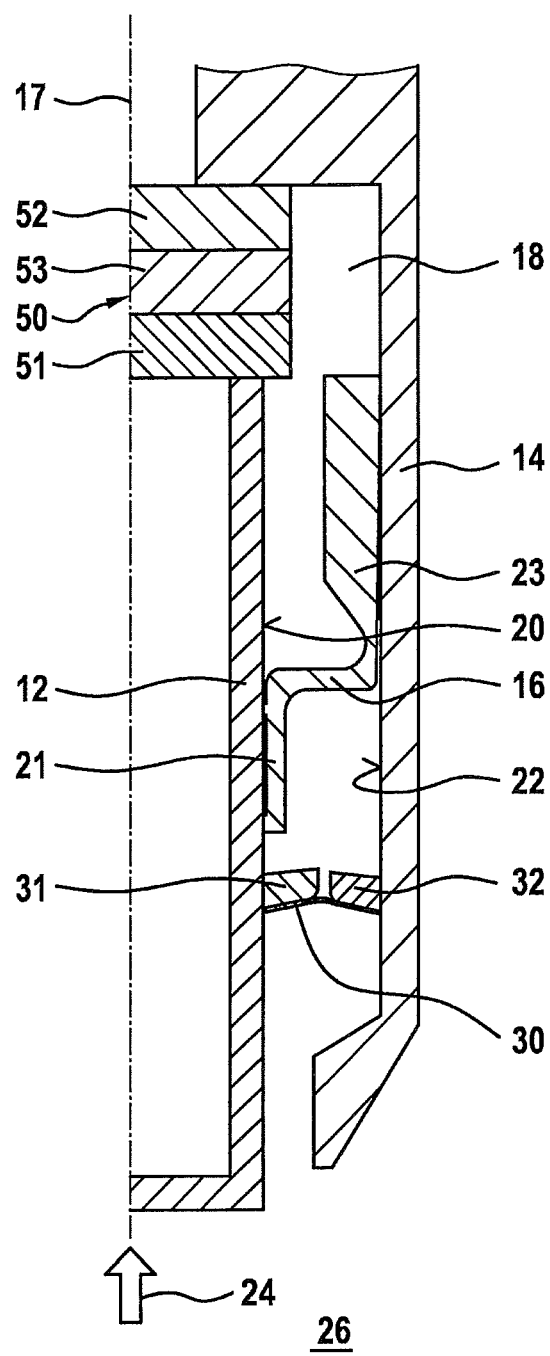
FIG. 1 shows a schematic configuration of a pressure-measuring device according to the present invention.

FIG. 1 shows a part of a pressure-measuring device on the combustion chamber side. The pressure-measuring device includes a force transmission body 12 that is situated in a housing 14. Force transmission body 12, which is exposed to combustion chamber 26 of an internal combustion engine, is situated with respect to housing 14 along a longitudinal axis 17 in a manner axially movable in housing 14. Force transmission body 12 is held within housing 14 using a flexible diaphragm 16. For this purpose, flexible diaphragm 16 has an inner supporting part 21 and an outer supporting part 23. Flexible diaphragm 16 is fastened, in this context, to inner supporting part 21 on an outer side 20 of force transmission body 12 and to outer supporting part 23 to an inner side 22 of housing 14, each by an encircling welding seam. Because of that, an inner space 18 configured between force transmission body 12 and housing 14 is sealed with respect to combustion chamber 26 of the internal combustion engine by diaphragm 16.

The pressure prevailing in combustion chamber 26, which exerts a pressure force 24 on force transmission body 12, has the effect that, based on flexible diaphragm 16, force transmission body 12 executes an axial motion with respect to housing 14, along longitudinal axis 17. Flexible diaphragm 16 is configured, having a flexural stiffness, in a resilient manner in such a way that force transmission body 12 is able to carry out within housing 14 the required axial motion so as to transmit the pressure force exerted on force transmission body 12 to a pressure-measuring unit 50. Pressure-measuring unit 50 includes, for example a first support element 51, a second support element 52 and a pressure sensor 53. First support element 51 is in operative connection with force transmission body 12. Second support element 52 is supported on housing 14. Between first support element 51 and second support element 52, pressure sensor 53 is situated using a prestressing force. Pressure sensor 53 may, for instance, be a piezo element, which records the pressure force acting on force transmission body 12 and passed on via first support element 51.

Between housing 14 and force transmission body 12 there is also situated a flexible additional diaphragm 30, which is preconnected to flexible diaphragm 16 on the combustion chamber side. Additional diaphragm 30 has the task of sealing flexible diaphragm 16 from combustion chamber 26, and thus to screen flexible diaphragm 16 from temperature effects and pressure effects from combustion chamber 26. Flexible additional diaphragm 30 is made of a floppy material, so that the flexural stiffness of flexible additional diaphragm 30 is clearly less than the flexural stiffness of flexible diaphragm 16.

Figure 2A:
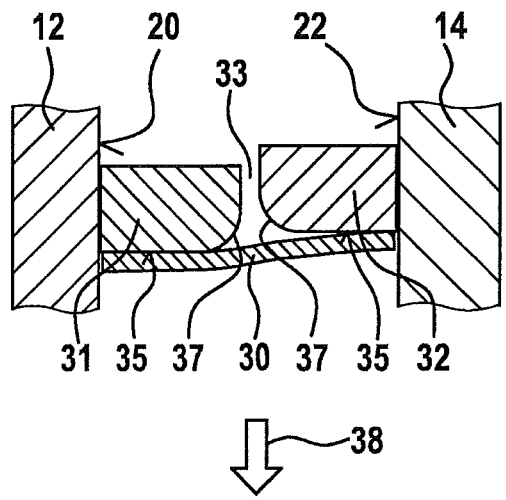
FIG. 2a shows a schematic view of a prestressed additional diaphragm in the mounted state.
Figure 2B:
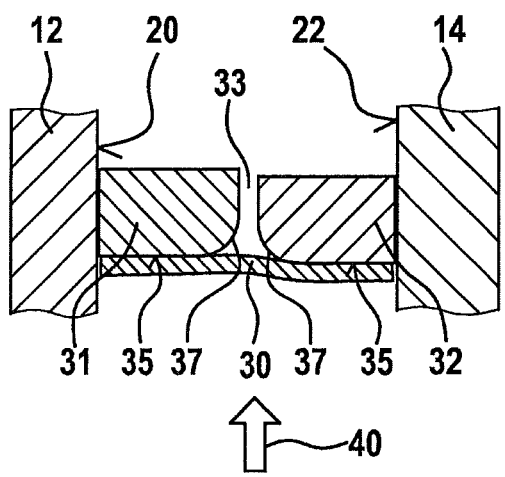
FIG. 2b shows a schematic view of an additional diaphragm in the operating state.

The execution of flexible additional diaphragm 30 is shown in greater detail in FIGS. 2a and 2b. On a side of flexible diaphragm 16 facing combustion chamber 26, a first supporting ring 31 and a second supporting ring 32 are accommodated. First supporting ring 31 is fastened on an outer side 20 of force transmission body 12 and second supporting ring 32 on an inner side 22 of housing 14, both in a sealing manner. Supporting rings 31, 32 each have an end face 35 facing combustion chamber 26. Between first and second supporting ring 31, 32 there is an annular gap 33, which encloses force transmission body 12. On end face 35 of supporting rings 31, 32, additional diaphragm 30 is applied. In this context, additional diaphragm 30 bridges annular gap 33, which is configured between first supporting ring 31 and second supporting ring 32. The width of gap 33 advantageously amounts to a single time to three times the thickness of additional diaphragm 30. This ensures a sufficient flexibility of additional diaphragm 30 and a reliable screening of flexural stiffness diaphragm 16 from the temperature effects and pressure effects from combustion chamber 26.

Additional diaphragm 30 is connected to supporting rings 31, 32, for example, by an encircling welding. Encircling weldings provide a resilient connection of metallic materials and are also able to be produced automatically. Furthermore, additional diaphragm 30 may have a thickness of 0.05 mm to 0.5 mm. An additional diaphragm of this thickness has a high fatigue limit, and at the same time is easily deformable, whereby the relative motion between the force transmission body and the housing is not impeded. Moreover, a specific embodiment of the pressure-measuring device according to the present invention may be used, in which annular gap 33 has a width less than 2 mm. An annular gap 33 of this width ensures an unimpeded relative motion of force transmission body 12 with respect to housing 14 and at the same time a slight deformation of additional diaphragm 30. Too great a deformation of additional diaphragm 30 lowers its service life and causes an inaccurate measurement of the pressure in combustion chamber 26.

FIG. 2a shows schematically first and second supporting ring 31, 32 in a mounted state, in which no pressure force 24 is acting upon pressure-measuring device 10. In this instance, first supporting ring 31 is offset axially compared to second supporting ring 32 along a longitudinal axis 17 in the direction of combustion chamber 26. Because of this, additional diaphragm 30 is acted upon by a prestressing force 38. Furthermore, first and second supporting rings 31, 32 have rounded outer edges 37 on end face 35, which lie in the region of an annular gap 33. Additional diaphragm 30 is mounted in a planar manner, in the form of a foil, on first and second supporting ring 31, 32, and bridges annular gap 33.

FIG. 2b shows schematically additional diaphragm 30, which is mounted on first and second supporting ring 31, 32, in the operating state, having the pressure effect of a pressure force 40 from combustion chamber 26. In this instance, prestressing force 38 is countered by pressure force 40. As a result of pressure force 40, force transmission body 12 is offset along longitudinal axis 17 away from combustion chamber 26. Additional diaphragm 30 lies against end faces 35 of supporting rings 31, 32 in a continuously planar manner. Between supporting rings 31, 32, annular gap 33 is configured, which is bridged by additional diaphragm 30. Against rounded edges 37 of supporting rings 31, 32, in this case, additional diaphragm 30 lies only partially. Because of that, in the region of annular gap 33, under a load, additional diaphragm 30 has a small deformation.

Figure 3:
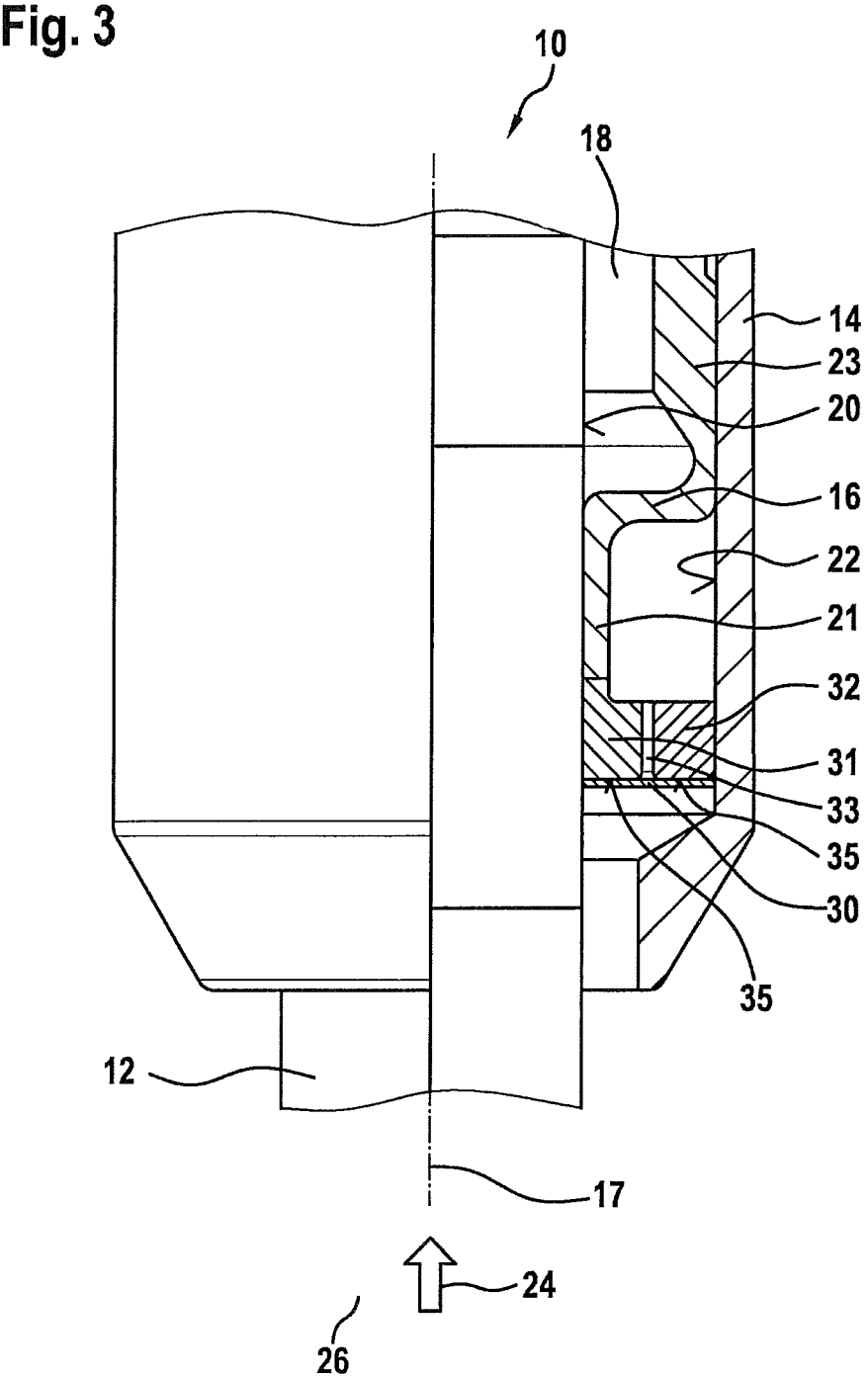
FIG. 3 shows a schematic cross section of a pressure-measuring device according to the present invention, according to a further specific embodiment.

In the pressure-measuring device shown schematically in FIG. 3, inner first supporting ring 31 borders directly on inner supporting part 21 of flexible diaphragm 16. Additional diaphragm 30 is shown in this case in a non-prestressed state and lies in a planar manner on end faces 35 of first and second supporting ring 31, 32, like a foil. Additional diaphragm 30 also bridges annular gap 33, in this case, which is configured between first and second supporting ring 31, 32, and consequently reliably seals the space on the combustion chamber side, ahead of flexible diaphragm 16.

What is claimed is:

1. A pressure-measuring device for recording a pressure in a combustion chamber of an internal combustion engine, comprising:
a force transmission body, situated in a housing, which is exposed to the combustion chamber and which transmits the combustion chamber pressure to a pressure-measuring unit at least indirectly by an axial motion;
a flexible diaphragm situated between the force transmission body and the housing, wherein the flexible diaphragm is configured to be resilient to implement an axial motion of the force transmission body within the housing; and
a flexible additional diaphragm connected ahead of the flexible diaphragm on the combustion chamber side, which seals the flexible diaphragm from the combustion chamber, wherein:
on an outer side of the force transmission body a first supporting ring is situated and on an inner side of the housing a second supporting ring is situated, and wherein the flexible additional diaphragm is situated between the first and the second supporting ring, an annular gap is between the first and the second supporting ring, the flexible additional diaphragm is situated on the first and the second supporting rings and covers the annular gap over end faces of the first and the second supporting rings, each end face includes a rounded edge, and the additional diaphragm lies against each rounded edge only partially.

2. The pressure-measuring device of claim 1, wherein the additional diaphragm is made of a floppy material, so that the flexural stiffness of the flexible additional diaphragm is clearly less than the flexural stiffness of the flexible diaphragm.

3. The pressure-measuring device of claim 1, wherein the flexible additional diaphragm covers the annular gap on the combustion chamber side of the first and the second supporting ring.

4. The pressure-measuring device of claim 1, wherein the additional diaphragm is sealingly welded to the supporting rings in an encircling manner.

5. The pressure-measuring device of claim 1, wherein the additional diaphragm is mounted in an axially prestressed state.

6. The pressure-measuring device of claim 1, wherein the additional diaphragm is made of a thermally conductive material.

7. The pressure-measuring device of claim 1, wherein the additional diaphragm is made of a high-strength steel alloy, particularly of an high-alloy high-grade steel.

8. The pressure-measuring device of claim 1, wherein the additional diaphragm is made of a corrosion-resistant material and of a fatigue-resistant material.

9. The pressure-measuring device of claim 1, wherein the additional diaphragm is a foil having a thickness of 0.05 mm to 0.5 mm.

* * * * *